United States Patent [19]
Fossum

[11] 3,916,859
[45] Nov. 4, 1975

[54] CARBURETOR ANTI-ICE AND OIL COOLING DEVICE

[76] Inventor: Gust S. Fossum, 42052-3rd St., E., Lancaster, Calif. 93534

[22] Filed: Feb. 7, 1975

[21] Appl. No.: 548,144

Related U.S. Application Data
[63] Continuation of Ser. No. 308,774, Dec. 15, 1972.

[52] U.S. Cl.... 123/122 AA; 123/122 E; 123/122 R; 261/DIG. 20
[51] Int. Cl.² ......................................... F02M 31/00
[58] Field of Search......... 123/122 R, 122 A, 122 D, 123/122 AA, 133, 122 E; 261/DIG. 20, 31

[56] References Cited
UNITED STATES PATENTS

| | | | |
|---|---|---|---|
| 2,125,216 | 7/1938 | Betry | 123/122 A |
| 2,719,519 | 10/1955 | Sutton | 261/DIG. 20 |
| 3,016,890 | 1/1962 | Bibo | 123/122 D |

Primary Examiner—Charles J. Myhre
Assistant Examiner—R. H. Lazarus

[57] ABSTRACT

A carburetor anti-icing system in which hot or warm oil is passed through a passageway disposed through the shaft of the carburetor throttle valve thereby warming the valve and preventing icing on the valve and also cooling the oil passing through the shaft.

4 Claims, 8 Drawing Figures

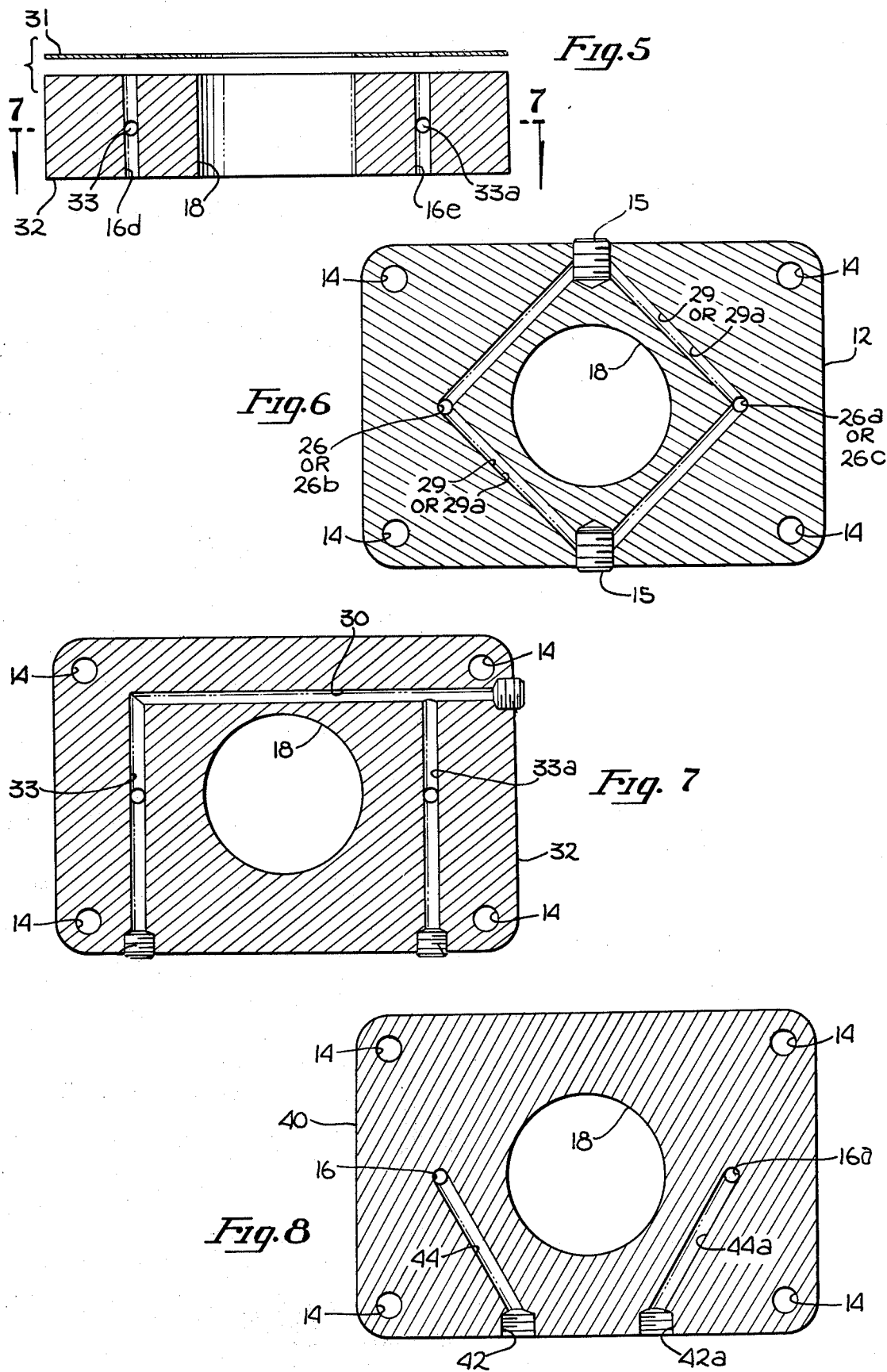

CARBURETOR ANTI-ICE AND OIL COOLING DEVICE

This is a continuation of application Ser. No. 308,774, filed Dec. 15, 1972.

BACKGROUND OF THE INVENTION

1. Prior Art

Carburetor icing is a problem, particularly in aircraft, air-cooled piston engines such as those engines commonly utilized in general aviation. Typically, in order to prevent carburetor icing, warm air is drawn from around the engine periodically in order to melt any ice which may have formed within the carburetor or to warm the carburetor. Drawing warm air into the engine reduces the efficiency of the engine. As will be seen the present invention overcomes problems associated with the prior art anti-icing systems.

2. Field of the Invention

This invention relates to the heating of carburetors and the cooling of engine oil of internal combustion engines using an air-fuel vaporizing carburetor and oil for engine lubrication.

SUMMARY OF THE INVENTION

An apparatus for preventing carburetor icing and also for cooling the oil in an engine is described. Oil, which is utilized to lubricate the engine, is passed through a passageway disposed through the interior of the carburetor valve. In the preferred embodiment a hollow throttle shaft is utilized which includes apertures disposed at its opposite ends. These apertures communicate with the interior of the throttle shaft. Oil, in one embodiment, is brought into one of the apertures on the shaft through a passageway disposed within the intake manifold and the base of the carburetor and returned to the engine through a similar passageway. The warm oil passing through the valve warms the valve, thereby preventing icing and additionally cools the oil which passes through the carburetor valve.

It is an objective of the present invention to provide a device for preventing the formation of ice on the carburetor throttle valve assembly and on other parts in the carburetor throat area. If ice is allowed to form there this will block the air-fuel flow, causing the loss of the low pressure (vacuum) through the venturi area and fuel jets in the carburetor throat area, thus producing a lean fuel-air mixture, loss of power and possible harm to the engine.

Another objective of the present invention is to provide a device that will help cool the hot engine oil by passing it through the cold carburetor parts in the carburetor icing area.

A further objective of the present invention is to prevent carburetor icing without the use of hot air, as hot air entering the carburetor will lower engine compression.

The specific objective of the present invention is to make available a device especially designed for aircraft engines where carburetor icing, oil over-heating, and loss of engine power can be major if not fatal problems.

A further objective of the present invention is that it will maintain the carburetor throttle area at a more uniform temperature for a more efficient running engine.

Additional objectives of the present invention are to provide a carburetor anti-ice and oil cooling device which can be produced, packaged, and sold in large quantities at a comparatively low cost, and which can be conveniently utilized on any vaporizing carburetor of an internal combustion engine.

Still further objectives, benefits, and advantages of this invention will become evident from a study of the following description taken in conjunction with the accompanying drawing.

BRIEF DESCRIPTION OF THE DRAWINGS

FIG. 5 is a cross sectional view taken along line 5—5 of FIG. 7, showing the interior of the auxiliary carburetor heating insert.

FIG. 6 is a cross sectional view taken along line 6—6 of FIG. 4, showing the interior of the device.

FIG. 7 is a cross sectional view taken along line 7—7 of FIG. 5, showing the interior of the auxiliary carburetor heating insert.

FIG. 8 is a cross-sectional plan view showing a portion of the intake manifold.

DETAILED DESCRIPTION OF THE INVENTION

Figure 1:
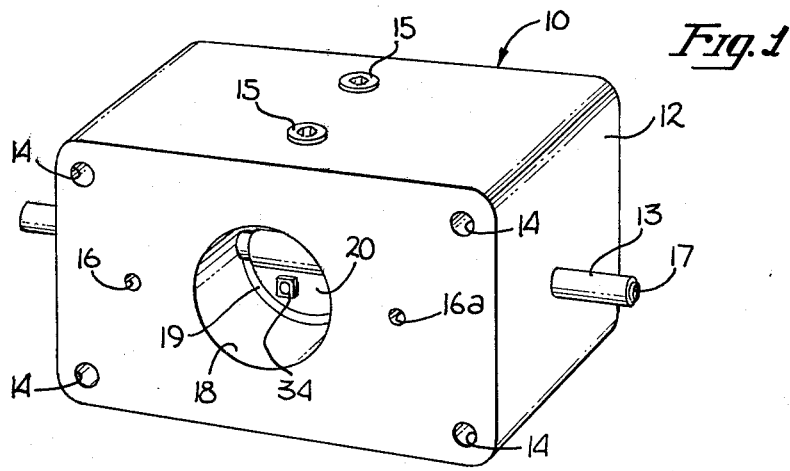
FIG. 1 is a perspective view of the bottom of a carburetor anti-ice and oil cooling device made in accordance with the present invention, omitting the auxillary carburetor heating insert as pictured in FIG. 5 and FIG. 7.
Figure 2:
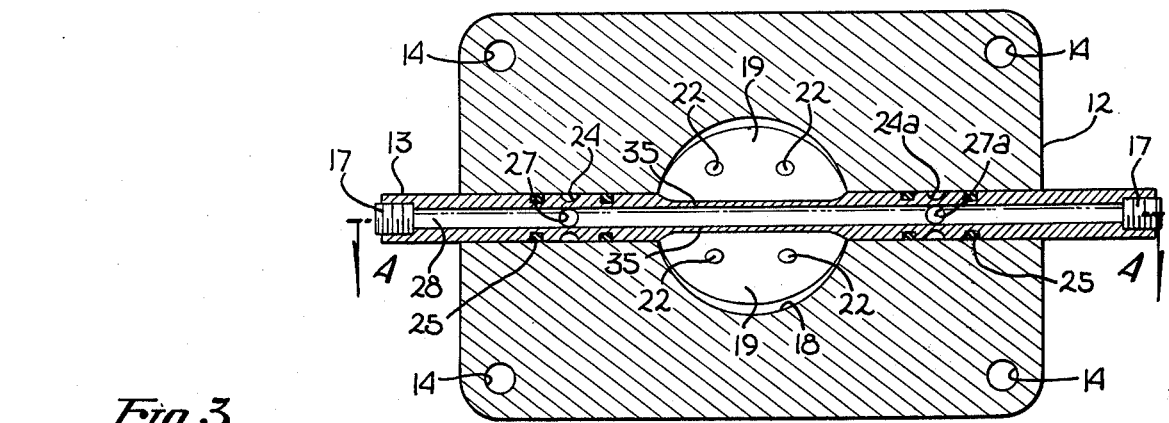
FIG. 2 is a cross sectional view taken along line 2—2 of FIG. 4, showing the interior of the device.
Figure 3:
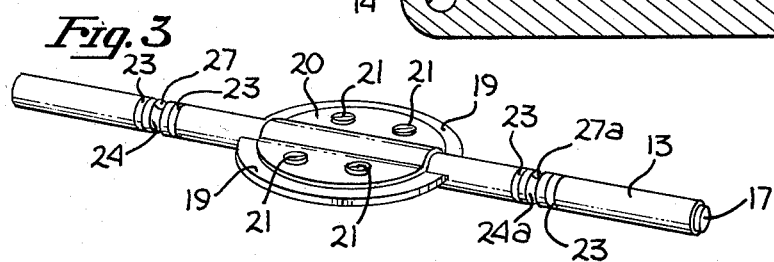
FIG. 3 is a perspective view of the throttle shaft and valve assembly.
Figure 4:
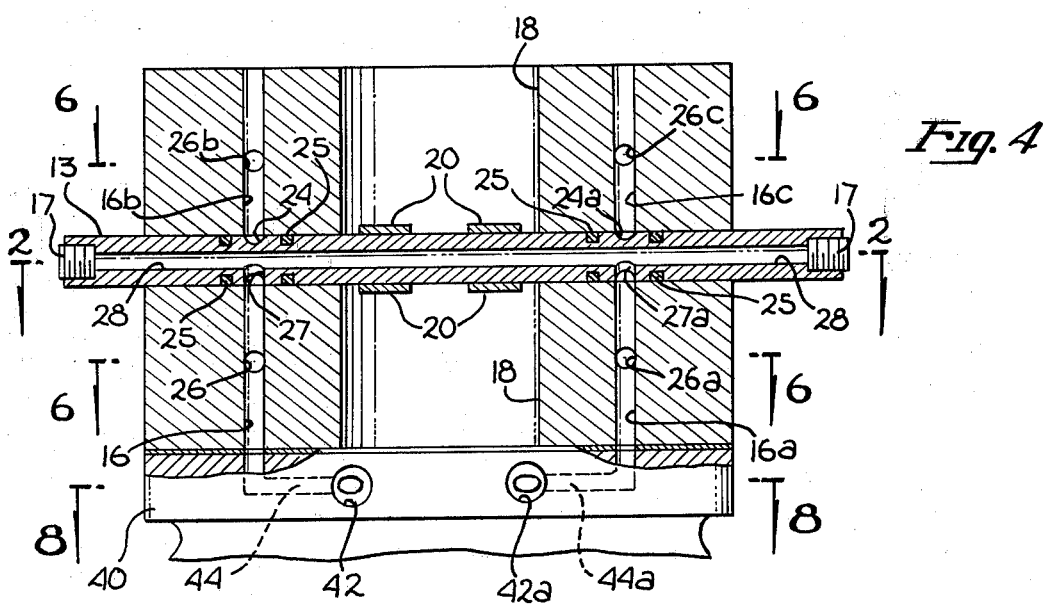
FIG. 4 is a cross sectional view taken along line 4—4 of FIG. 2, showing the interior of the device and a portion of the intake manifold.

Referring now specifically to the drawing, a carburetor anti-ice and oil cooling device 10 made in accordance with the present invention is shown to include a carburetor-throttle base 12 with either a singular (as shown) or multiple throttle throats 18. A hollow throttle shaft 13 with a throttle shaft oil passage plug hole (threaded) 17 on each end, has attached to it a throttle valve 19 inserted into milled grooves 35 of throttle shaft 13 and secured by a throttle valve saddle clamp 20 on each side of the throttle valve 19 and held in place by screws 21 which go through the valve holes 22 and attach to the opposite clamp 20 by the valve clamp nuts 34. Also in the carburetor-throttle base 12 are bolt holes 14, oil passage plug holes 15 (threaded), and oil passages 16, 16a, 16b, and 16c. On the throttle shaft 13 are two sets of O-ring seal grooves 23 with an oil passage groove 24 and 24a between the O-ring seals 25. In the oil passage grooves 24 and 24a are throttle shaft oil passage openings 27 and 27a, respectively, which connect to the throttle shaft oil passage 28. Oil passage 29 connects to vertical oil passage 16 and 16a at oil passage junctions 26 and 26a, respectively. Oil passage 29a connects to vertical oil passages 16b and 16c at oil passage junctions 26b and 26c, respectively. The Auxiliary carburetor heating insert oil passage 30 connects to vertical oil passages 16d and 16e at oil passage junctions 33 and 33a, respectively. The auxiliary carburetor heating insert 32 may be used in conjunction with the carburetor anti-ice and oil cooling device or each separately, inserted either above or below or above and below the carburetor-throttle base 12 with a gasket 31 placed between the carburetor-throttle base 12 and said insert 32. A section of an intake manifold flange 40 is shown in FIGS. 4 and 8 and includes fittings 42 and 42a, and passages 44 and 44a which are angled to communicate with passages 16 and 16a, respectively.

The operation of this device will now be readily understood. Hot oil is picked up from the engine block at an oil pressure fitting on the pressure side of the oil pump. From there the hot oil, under pressure, is transported through oil lines and fittings to the carburetor intake manifold flange 40 at fitting 42. The hot oil then passes through the manifold flange 40 through passage 44 and into passage 16 of the carburetor-throttle base 12. The hot oil after passing through oil passage 16 enters oil passage groove 24. The O-ring seals 25 seal the shaft to prevent oil leakage. From there the oil enters the throttle shaft oil passage opening 27 and into the throttle shaft oil passage 28, heating the throttle shaft and valve assembly. The oil then leaves the shaft at the throttle shaft oil passage opening 27a and passes down oil passage 16a, out the carburetor-throttle base 12, through passage 44a of the intake manifold flange (note the plugs 17 prevent the oil from passing out the ends of passage 28). The cooled oil then passes through oil lines and fittings and returns to the engine oil reservoir. The hot oil as it passes through the carburetor-throttle base 12, the throttle shaft 13, and/or the auxiliary carburetor heating insert 32 heats these parts thereby preventing carburetor icing and inturn these cold parts cool the oil.

There are several optional ways of implementing the carburetor anti-ice and oil cooling device 10. First, one may use the procedure as stated above. Second, one may add an oil passage system 29 (as shown in FIG. 6) either above, below or above and below the throttle valve assembly. When this system is used below the throttle valve assembly some of the hot oil passing through oil passage 16 enters oil passage junction 26 and is diverted through oil passage 29 and out oil passage junction 26a into oil passage 16a. Third, one may add the auxiliary carburetor heating insert 32 either above, below, or above and below the carburetor-throttle base 12. If the auxiliary carburetor heating insert 32 is used below the carburetor-throttle base 12 some of the hot oil passing through the manifold flange and oil passage 16d of the insert 32 will enter oil passage 30 through oil passage junction 33 and pass out through oil passage junction 33a into oil passage 16e. If the auxiliary carburetor heating insert 32 is used above the carburetor-throttle base 12 some of the oil passing through oil passage 16 and into oil passage groove 24 will continue up through oil passage 16b and into oil passage 16d of the insert 32 from there it passes into oil passage junction 33, through oil passage 30 and out oil passage junction 33a into oil passage 16e down through oil passage 16c, through oil passage groove 24a and out oil passage 16a. Fourth, one may bring oil into the passageway system through fittings into the oil passage plug holes 15 (threaded) and/or 17 and/or 31 instead of through the intake manifold flange. Fifth, one may use one or more of the above mentioned procedures, omitting or adding any part or any combination of parts thereof, to obtain the desired effects.

While this invention has been described with particular reference to the construction shown in the drawing and while various changes may be made in detailed construction, it shall be understood that such changes shall be within the spirit and scope of the present invention as defined by the appended claims.

Having thus completely and fully described the invention, what is now claimed as new and desired to be protected by Letters Patent of the United States is:

1. An aircraft engine having an oil lubrication system and a carburetor which includes a base defining a carburetor throat, and an apparatus for preventing carburetor icing comprising:
   a generally hollow elongated throttle shaft disposed across said carburetor throat and mounted on said carburetor base for rotation about its axis, each end of said shaft including two spaced apart seal grooves, an oil passage groove disposed between said seal grooves, and a plurality of apertures disposed through said shaft within said oil passage groove such that said oil passage groove communicates with the interior of said shaft;
   a throttle valve disposed within said carburetor throat, coupled to said throttle shaft;
   four o-ring seals, one disposed in each of said seal grooves;
   an inlet oil passageway defined by said carburetor base, said inlet passageway terminating in one of said oil passage grooves of said throttle shaft, said inlet passageway for receiving oil from said oil lubrication system of said engine;
   an outlet oil passageway defined by said carburetor base extending from the other of said oil passage groove of said throttle shaft for returning oil from said shaft to said oil lubrication system of said engine;
   whereby warm oil from said engine may be recirculated in said hollow throttle shaft thereby preventing carburetor icing and also cooling the oil.

2. The apparatus defined by claim 1 including a pair of threaded plug holes in said carburetor base, one communicating with said inlet passageway and the other communicating with said outlet passageway.

3. The apparatus defined in claim 2 wherein said throttle shaft is generally cylindrical and wherein each end of said shaft extends beyond said carburetor base.

4. The apparatus defined by claim 3 wherein plugs are disposed in the ends of said hollow shaft such that said shaft defines a volume into which oil may flow from said one of said oil passage grooves and from which oil may leave through said other of said oil passage grooves.

* * * * *